(12) United States Patent
Lee et al.

(10) Patent No.: US 11,503,689 B1
(45) Date of Patent: Nov. 15, 2022

(54) CIRCUIT PROTECTION APPARATUS, SNUBBER CIRCUIT, AND METHOD OF OPERATING CIRCUIT PROTECTION APPARATUS

(71) Applicant: HERGY INTERNATIONAL CORP., Taipei (TW)

(72) Inventors: Cheng-Jen Lee, Taipei (TW); Yen-Lin Chen, Taipei (TW); Chun-Hung Lu, Taipei (TW)

(73) Assignee: HERGY INTERNATIONAL CORP., Taipei (TW)

( * ) Notice: Subject to any disclaimer, the term of this patent is extended or adjusted under 35 U.S.C. 154(b) by 0 days.

(21) Appl. No.: 17/547,697

(22) Filed: Dec. 10, 2021

(51) Int. Cl.
*H05B 45/50* (2022.01)
*H02H 3/093* (2006.01)

(52) U.S. Cl.
CPC ............ *H05B 45/50* (2020.01); *H02H 3/093* (2013.01)

(58) Field of Classification Search
None
See application file for complete search history.

(56) References Cited

U.S. PATENT DOCUMENTS

| 9,237,621 | B1 * | 1/2016 | Xiong | H05B 45/10 |
| 2011/0025217 | A1 * | 2/2011 | Zhan | H02M 3/335 |
| | | | | 315/219 |
| 2012/0286696 | A1 * | 11/2012 | Ghanem | H05B 45/3725 |
| | | | | 315/291 |
| 2015/0289332 | A1 | 10/2015 | Chen | |
| 2018/0050631 | A1 | 2/2018 | Wonhong et al. | |
| 2020/0195003 | A1 * | 6/2020 | Lin | H03K 17/08122 |

FOREIGN PATENT DOCUMENTS

| CN | 200980182 Y | 11/2007 |
| CN | 103002627 A | 3/2013 |
| CN | 209358810 U | 9/2019 |
| TW | 201230863 A | 7/2012 |

* cited by examiner

*Primary Examiner* — Anh Q Tran
(74) *Attorney, Agent, or Firm* — Muncy, Geissler, Olds & Lowe, P.C.

(57) ABSTRACT

A circuit protection apparatus (100) is used to protect an LED drive circuit (200), and the circuit protection apparatus (100) includes a first switch unit (1) and a snubber circuit (3). The first switch unit (1) provides an electrical connection between an input terminal (100A) and the LED drive circuit (200) according to the normality of an input current (Iin) flowing through the input terminal (100A). The snubber circuit (3) provides a first delay time period (Td1) according to an input power (Vin). The snubber circuit (3) provides a start signal (Ss) to the LED drive circuit (200) according to the end of the first delay time period (Td1), and controls a first ground point (G1) of the snubber circuit (3) to be coupled to a second ground point (G2) of the LED drive circuit (200).

15 Claims, 5 Drawing Sheets

CIRCUIT PROTECTION APPARATUS, SNUBBER CIRCUIT, AND METHOD OF OPERATING CIRCUIT PROTECTION APPARATUS

BACKGROUND

Technical Field

The present disclosure relates to a circuit protection apparatus, a snubber circuit, and a method of operating the circuit protection apparatus, and more particularly to a circuit protection apparatus, a snubber circuit, and a method of operating the circuit protection apparatus configured for protecting an LED drive circuit.

Description of Related Art

The statements in this section merely provide background information related to the present disclosure and do not necessarily constitute prior art.

Due to the progress of the times and technology, more and more light source products use LED lamps (lights) to replace traditional light bulbs. Moreover, since LED lamps have the characteristics of high efficiency, small size, and high control stability, more and more light source products for LED lamps on the market have gradually replaced traditional light bulb products. In order to supply power and control the LED lamps, usually in the front stage of the LED lights, an LED drive circuit must be used to drive the LED lamps, and an additional protection circuit is installed to protect the LED drive circuit.

Furthermore, the protection circuit of the LED drive circuit is usually mainly used to protect the LED drive circuit from the impact of the input surge so as to avoid the LED drive circuit failure or damage due to the surge caused by the LED drive circuit. The main protection method of the protection circuit is usually to use electronic components such as resistors to suppress input surges. Although the peak value of the input surge may be suppressed by such method, the magnitude of the peak value of the surge is not predictable at the moment when the LED drive circuit is connected to the input power. Therefore, if a situation with a high surge peak occurs, even if a protection circuit is used to suppress the input surge, it may still cause the LED drive circuit to fail or be damaged due to the high surge peak.

SUMMARY

In order to achieve the above-mentioned problems, the present disclosure provides a circuit protection apparatus to solve the problems of existing technology. The circuit protection apparatus is provided to protect an LED drive circuit. The circuit protection apparatus includes a first switch unit and a snubber circuit. The first switch unit is coupled between an input terminal and the LED drive circuit, and provides an electrical connection between the input terminal and the LED drive circuit according to the normality of an input current flowing through the input terminal. The snubber circuit is coupled to the first switch unit and the LED drive circuit, and provides a first delay time period according to an input power. The snubber circuit provides a start signal to the LED drive circuit according to the end of the first delay time period, and controls a first ground point of the snubber circuit to be coupled to a second ground point of the LED drive circuit.

In order to achieve the above-mentioned problems, the present disclosure provides a snubber circuit to solve the problems of existing technology. The snubber circuit is coupled to an LED drive circuit, and delays starting the LED drive circuit according to in input power. The snubber circuit includes a control unit and a second switch unit. The control unit is coupled to the LED drive circuit, and sets and counts a first delay time period. The second switch unit is coupled to the control unit, a first ground point of the snubber circuit, and a second ground point of the LED drive circuit. The control unit delays the first delay time period according to the input power, provides a start signal to the LED drive circuit according to the end of the first delay time period, and provides a control signal to turn on the second switch unit according to the end of the first delay time period so as to control the first ground point to be coupled to the second ground point.

In order to achieve the above-mentioned problems, the present disclosure provides a method of operating a circuit protection apparatus to solve the problems of existing technology. The method of operating the circuit protection apparatus protects an LED drive circuit. The method includes steps of: detecting and determining whether an input current is normal, and turning on a first switch unit according to the normality of the input current; receiving an input power by turning on the first switch unit, and delaying a first delay time period according to the input power; providing a start signal to the LED drive circuit according to the end of the first delay time period, and controlling a first ground point of the circuit protection apparatus to be coupled to a second ground point of the LED drive circuit.

The main purpose and effect of the present disclosure is to use a circuit protection apparatus to provide a two-step snubber protection mechanism. The first step is to drive a controller inside the LED drive circuit after a delay time period, and the second step is to make the ground point of the controller of the LED drive circuit and the circuit protection apparatus be grounded together (commonly ground) so as to avoid the input surge causing damage or failure of the LED drive circuit, and then achieve the double protection of the LED drive circuit and extend the life of the LED drive circuit as much as possible.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
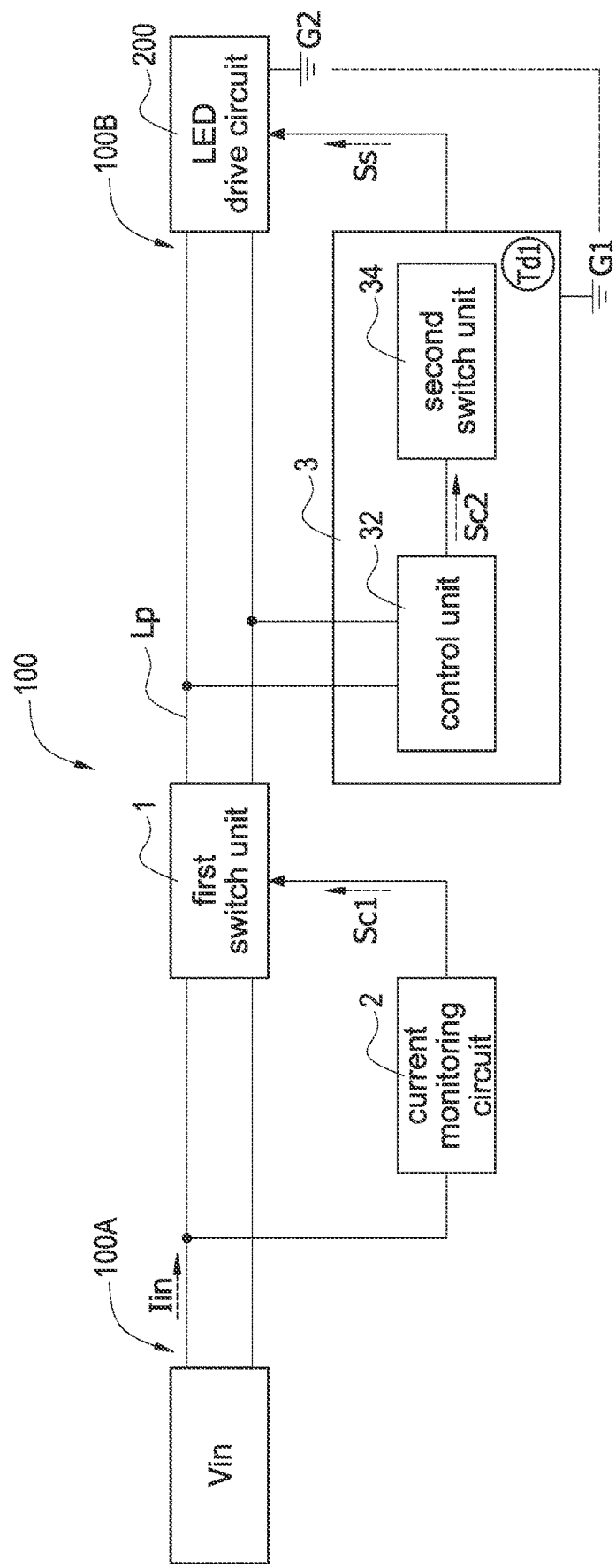
FIG. 1 is a block circuit diagram of a circuit protection apparatus applied to protect an LED drive circuit according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a circuit protection apparatus applied to protect an LED drive circuit according to the present disclosure. The circuit protection apparatus 100 is coupled to the LED drive circuit 200, and the circuit protection apparatus 100 is used to detect and control an input power Vin to protect the LED drive circuit 200, thereby avoiding the failure or damage of the LED drive circuit 200 caused by the abnormality of the input power Vin. The circuit protection apparatus 100 includes a first switch unit 1, a current monitoring circuit 2, and a snubber circuit 3. The snubber 3 includes a control unit 32 and a second switch unit 34. The circuit protection apparatus 100 further incudes an input terminal 100A and an output terminal 100B. The input terminal 100A receives the input power Vin and the output terminal 100B is coupled to the LED drive circuit 200. The first switch unit 1 is coupled between the input terminal 100A and the output terminal 100B, and is used to provide a power supply path Lp of supplying power to the LED drive circuit 200 when the first switch unit 1 is turned on due to the normality of an input current Iin flowing through the input terminal 100A so that the input terminal 100A and the LED drive circuit 200 are electrically connected. In particular, the first switch unit 1 may be a semiconductor switch component, but may also be a component having a function of disconnecting the power path, such as a relay.

The current monitoring circuit 2 is coupled to the input terminal 100A and the first switch unit 1, and is used to detect and determine whether the input current Iin is normal or not to turn on or turn off the first switch unit 1. When the current monitoring circuit 2 detects and determines that the input current Iin is abnormal, a first control signal Sc1 provided from the current monitoring circuit 2 is used to turn off the first switch unit 1 so that the power supply path Lp between the input terminal 100A and the output terminal 100B is disconnected. When the current monitoring circuit 2 detects and determines that the input current Iin is normal, the first control signal Sc is used to turn on the first switch unit 1 so that the power supply path Lp between the input terminal 100A and the output terminal 100B is connected. In particular, the circuit protection apparatus 100 may not include the current monitoring circuit 2 according to actual circuit conditions, and the first switch unit 1 is controlled by the first control signal Sc provided by an external apparatus. For example, but not limited to, the input terminal 100A is coupled to a front-stage conversion circuit (not shown), and the front-stage conversion circuit provides the first control signal Sc of controlling the first switch unit 1. In one embodiment, the abnormality of the input current Iin means that, for example, but not limited to, the input current Iin is too small or too large (that is, exceeds a predetermined range), or even no input current Iin (that is, there is no input power Vin).

The snubber circuit 3 is coupled between the first switch unit 1 and the output terminal 100B, and the snubber circuit 3 operates after a delay time period (i.e., the first delay time period) according to the (received) input power Vin. After the first delay time period, the snubber circuit 3 starts the LED drive circuit 200 so that the input power Vin is a normal and stable power when the LED drive circuit 200 is in actual operations. Therefore, it is to prevent the LED drive circuit 200 from operating under abnormal conditions where the input power Vin has a surge, resulting in the risk of failure or damage to the LED drive circuit 200. Moreover, when the current monitoring circuit 2 detects and determines that the input current Iin is abnormal, the first switch unit 1 is turned off to disconnect the power supply path Lp, and the LED drive circuit 200 and the snubber circuit 3 cannot receive the input power Vin.

When the current monitoring circuit 2 detects and determines that the input current Iin is normal (that is, the current value of the input current Iin is from outside a determined range into the determined range), the first switch unit 1 is turned on to connect the power supply path Lp. In this condition, the LED drive circuit 200 receives the input power Vin, but an internal controller (not shown) cannot be operated since it has not been activated. In addition, the snubber circuit 3 also receives the input power Vin, and operates after the first delay time period Td1 according to the (received) input power Vin. After the end of the first delay time period Td1, the snubber circuit 3 provides the start signal Ss to the internal controller of the LED drive circuit 200 to activate the internal controller. Moreover, the snubber circuit 3 also controls a first ground point G1 of the snubber circuit 3 to be coupled to a second ground point G2 of the LED drive circuit 200 so that the first ground point G1 and the second ground point G2 are grounded together (commonly grounded). After the two steps are completed, the internal controller of the LED drive circuit 200 is activated, and then the LED drive circuit 200 is driven. In particular, the second ground point G2 may be the ground point of some/all components (such as output capacitors, power switches, etc.) of the converter (not shown) inside the LED drive circuit 200. Without the ground point of these components, the converter of the LED drive circuit 200 cannot normally work.

Specifically, at the moment when the first switch unit 1 is turned on, an input capacitor (not shown) inside the LED drive circuit 200 has no power and is almost short-circuited. Therefore, at the moment when the input power Vin is connected to the LED drive circuit 200, it will cause input surge. Therefore, the function of the snubber circuit 3 is to ensure that the input power Vin returns to a stable state without generating a surge after a short delay time period, and then the LED drive circuit 200 is started (activated) so as to protect the LED drive circuit 200. The (start) activation action is divided into two parts, these two parts are independent of each other, and both should be completed before the LED drive circuit 200 can be successfully started. The first part is to start the controller inside the LED drive circuit 200 so that the internal controller can start to operate. The second part is to connect an independent and floating ground point with the ground point of the snubber circuit 3 so that the LED drive circuit 200 has a complete common-connected ground network. Therefore, the controller of the LED drive circuit 200 can control the converter inside the LED drive circuit 200 (for example, but not limited to, a buck or boost converter, and the converter type may be isolated or non-isolated) so that The LED drive circuit 200 controls the lighting behavior of an internal LED light (not shown).

Figure 3:
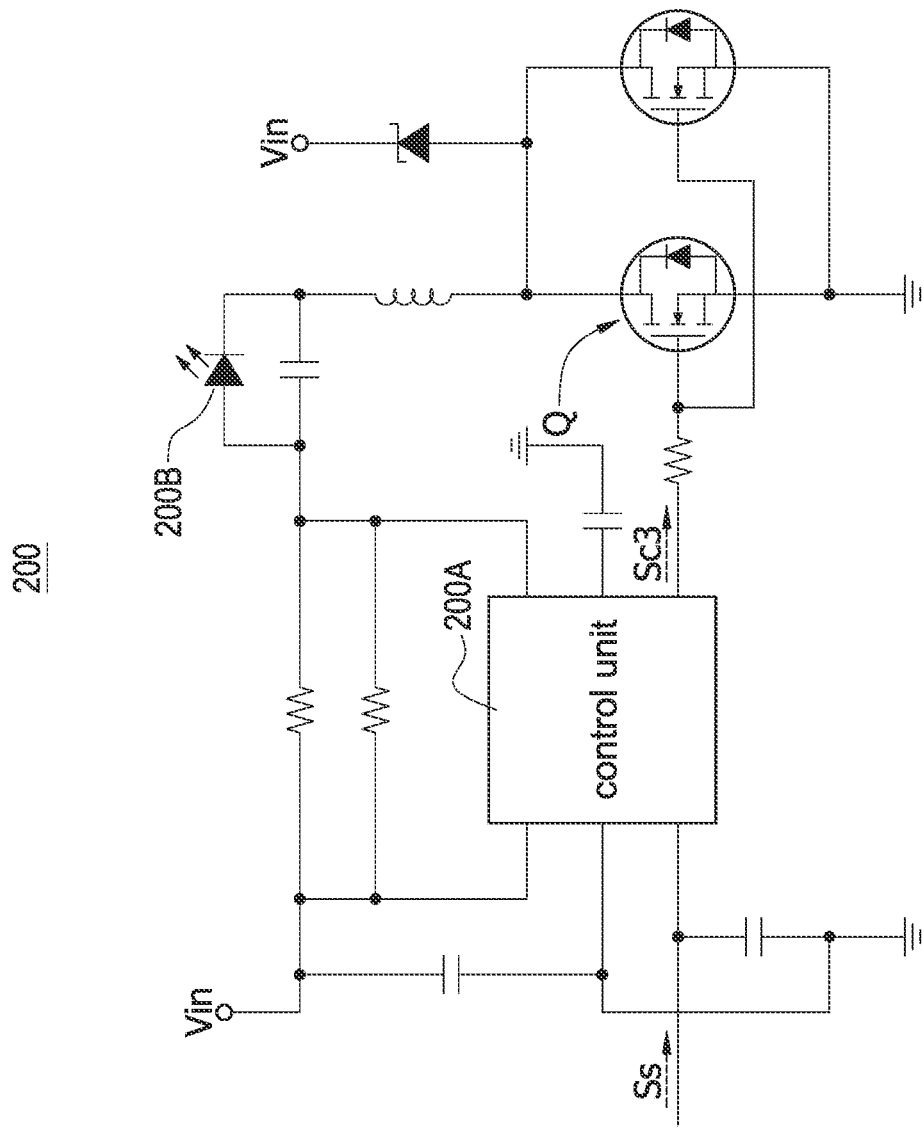
FIG. 3 is a partial detailed circuit block diagram of the LED drive circuit according to the present disclosure.

Moreover, the control unit 32 is coupled to the first switch unit 1 and the LED drive circuit 200, and sets and counts the first delay time period Td1. The first delay time period Td1 may be, for example, but not limited to, 1 to 4 seconds, and 2.8 to 3.2 seconds is a preferred embodiment so as to ensure that the input power Vin is in a steady state and will not produce a surge. The second switch unit 34 is coupled to the control unit 32, the first ground point G1, and the second ground point G2. When the second switch unit 34 is turned off, the first ground point G1 and the second ground point G2 are not connected together so that the second ground point G2 is an independent and floating ground point. On the contrary, the first ground point G1 and the second ground point G2 are connected together so that the LED drive circuit 200 has a complete common-connected ground network. After the control unit 32 receives the input power Vin, the control unit 32 starts counting according to the predetermined first delay time period Td1. When the counting of the first delay time period Td1 expires, the control unit 32 provides the start signal Ss to the controller inside the LED drive circuit 200 so that the controller can start to operate. On the other hand, the control unit 32 also provides the second control signal Sc2 to the second switch unit 34 to turn on the second switch unit 34 so as to connect the first ground point G1 to the second ground point G2. In particular, the start signal Ss and the second control signal Sc2 may be separate signals as shown in FIG. 3 (the delay will be explained later), or they may be integrated signals (that is, the start signal Ss is the second control signal Sc2), and therefore the number of pins of the control unit 32 may be saved, and the stability of the (synchronous) signal system is also better.

In one embodiment, the second switch unit 34 may be disposed (arranged) outside the control unit 32, and the second switch unit 34 is controlled to be turned on or turned off by the second control signal Sc2 provided from the control unit 32, but it is not limited to this. In other words, the second switch unit 34 may be also integrated inside the control unit 32 so that only the control unit 32 achieves the two-part (start) activation action.

Figure 2:
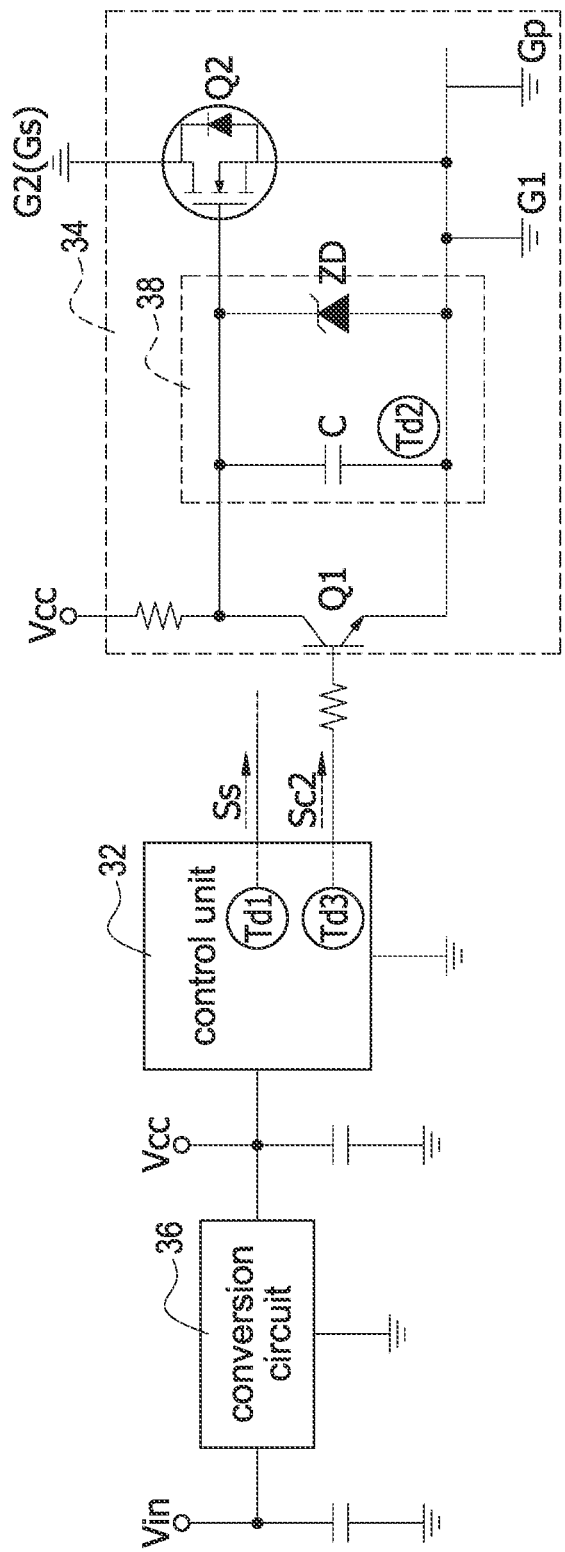
FIG. 2 is a partial detailed circuit block diagram of a snubber circuit according to the present disclosure.

Please refer to FIG. 2, which shows a partial detailed circuit block diagram of a snubber circuit according to the present disclosure, and also refer to FIG. 1. Besides the control unit 32 and the second switch unit 34, the snubber circuit 3 further includes a conversion circuit 36 and a time delay circuit 38. The conversion circuit 36 is coupled to the first switch unit 1, the output terminal 100B, and the control unit 32, and the conversion circuit 36 is used to convert the input power Vin into the working power Vcc to supply power to the control unit 32. Specifically, the voltage that the control unit 32 may usually receive is about 12 volts or less. If the value of the input power Vin is too high (for example, but not limited to 48 volts), the conversion circuit 36 is required to convert the input power Vin into a voltage suitable for driving the control unit 32. However, if the input power Vin can directly supply and drive the control unit 32, this circuit may be omitted. In one embodiment, the conversion circuit 36 may preferably be a step-down converter, and a linear regulator (LDO) is the best due to its lower cost.

The control unit 32 may be a controller, and the controller may be a combinational logic controller or a microprogram controller. The control unit 32 respectively provides the start signal Ss and the second control signal Sc2 to the controller 200A (shown in FIG. 3) of the LED drive circuit 200 and the second switch unit 34. Specifically, the second switch unit 34 includes a first switch Q1 and a second switch Q2. A control end of the first switch Q1 is coupled to the control unit 32, and a first end of the first switch Q1 receives the working voltage Vcc and a second end of the first switch Q1 is the first ground point G1. A first end of the second switch Q2 is the second ground point G2 and a second end of the second switch Q2 is coupled to the first ground point G1, and a control end of the second switch Q2 is coupled to the first end of the first switch Q1. In the absence of the delay circuit 38, when the control unit 32 provides the second control signal Sc2 to the second switch unit 34, the first switch Q1 is turned on. Since the first switch Q1 is turned on, the second switch Q2 is also turned on so that the first ground point G1 is connected to the second ground point G2.

The delay circuit 38 is coupled to the second switch unit 34 to provide a second delay time period Td2 (for example, but not limited to, 0.1 seconds) according to the second control signal Sc2 to delay turning on the second switch Q2 of the second switch unit 34. In this condition, the control unit 32 further sets a third delay time period Td3 (for example, but not limited to, 1 to 3 seconds). The control unit 32 provides the second control signal Sc2 to the first switch Q1 of the second switch unit 34 according to the end of the third delay time period Td3, and the second switch Q2 of the second switch unit 34 is turned on after the end of the second delay time period Td2 provided by the delay time circuit 38. Specifically, the delay time circuit 38 is connected in parallel to the first switch Q1, and the delay time circuit 38 includes a capacitor C and a voltage regulator ZD. When the third delay time period Td3 ends, the control unit 32 provides the second control signal Sc2 to the first switch Q1 of the second switch unit 34, and therefore the first switch Q1 is turned on so that the capacitor C starts to be charged by the working voltage Vcc. When the capacitor C is charged to a specific voltage (i.e., the second delay time period Td2), the second switch Q2 is turned on so that the first ground point G1 is connected to the second ground point G2. It is assumed that the capacitor C is fully charged in 0.1 seconds and the second delay time period Td2 does not exceed the voltage regulator ZD to start (activate) the voltage regulation function. After the second delay time period Td2 ends, the control unit 32 provides the start signal Ss to start the controller 200A.

Therefore, the first delay time period Td1 (for example, but not limited to, 3.1 seconds) is equal to the sum of the second delay time period Td2 (for example, but not limited to, 0.1 seconds) and the third delay time period Td3 (for example, but not limited to, 3 seconds). That is, the control unit 32 provides the second control signal Sc2 after a delay of 3 seconds, and provides the start signal Ss after a delay of 3.1 seconds. Accordingly, mutually independent protections can be provided for the LED drive circuit 200 to achieve double protection and extend the life of the LED drive circuit 200 as much as possible. In particular, although the second delay time period Td2 is responsive to the capacitance of the delay circuit 38 (that is, the capacitance of the capacitor C) in this embodiment, it is not limited to this. In other words, the second delay period Td2 may be also replaced by a circuit with delay function such as a counter. In addition, the first delay time period Td1 is the total time (sum) of the second delay time period Td2 and the third delay time period Td3, and the total time is preferably 2.5 to 3.5 seconds. The reason is that it can avoid the situation that the user mistakenly believes that the LED drive circuit 200 is invalid or damaged due to the excessively long delay.

On the other hand, when the LED drive circuit 200 uses an isolated converter (that is, an internal transformer isolates the primary-side circuits and the secondary-side circuits) for power conversion, the LED drive circuit 200 includes a primary-side ground point Gp and a secondary-side ground point Gs. The primary-side ground point Gp is coupled to the first ground point G1, and the secondary-side ground point Gs is the independent and floating second ground point G2.

When the second switch Q2 is turned on, the primary-side ground point Gp is connected to the secondary-side ground point Gs, that is, that the primary-side ground point Gp and the secondary-side ground point Gs are grounded together (commonly ground) so that the converter inside the LED drive circuit 200 can normally operate.

As shown in FIG. 3, the LED drive circuit 200 includes a controller 200A, a power switch Q of the converter, and an LED light 200B. The controller 200A is coupled to the control unit 32 through a pin and receives the start signal Ss. After the controller 200A receives the start signal Ss, the controller 200A starts to operate according to the input power Vin to provide the third control signal Sc3 to control the switching of the power switch Q. The LED light 200B is coupled to the power switch Q, and emits light through the switching of the power switch Q.

In one embodiment, FIG. 2 and FIG. 3 show some of the detailed circuits of the snubber circuit 3 and the LED drive circuit 200 representing the spirit of the present disclosure, and circuits not mentioned are not features of the present disclosure. In one embodiment, the snubber circuit 3 is not limited to be implemented with the circuit structure of FIG. 2, that is, any circuit structure and control method that may achieve two-stage delay protection should be included in the scope of this embodiment. On the other hand, the LED drive circuit 200 is not limited to only being implemented with the circuit structure of FIG. 3, and it may have different circuit structures according to the type of controller 200A.

Figure 4:
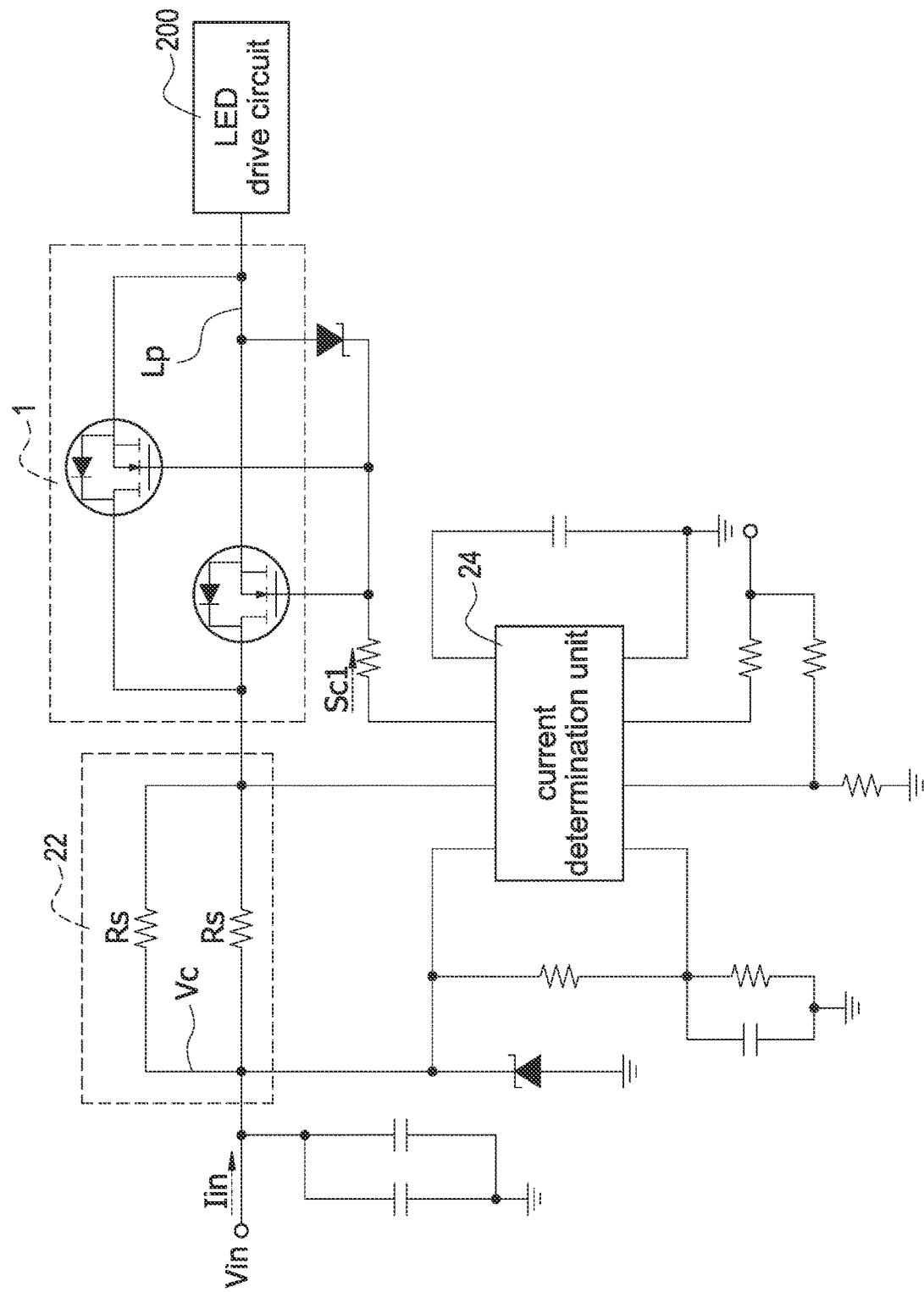
FIG. 4 is a partial detailed circuit block diagram of a current monitoring circuit and a first switch unit according to the present disclosure.

Please refer to FIG. 4, which shows a partial detailed circuit block diagram of a current monitoring circuit and a first switch unit according to the present disclosure, and also refer to FIG. 1 to FIG. 3. The current monitoring circuit 2 has functions of monitoring and controlling the input current Iin, and includes a current detection unit 22 and a current determination unit 24. The current detection unit 22 may be a sense (detection) resistor Rs, and the current determination unit 24 may be a controller. The current detection unit 22 is coupled to the input terminal 100A and the first switch unit 1. The current determination unit 24 is coupled to the current detection unit 22 and the first switch unit 1. The current detection unit 22 is used to generate a cross voltage Vc corresponding to the magnitude of the input current Iin according to the input current Iin flowing through the sense (detection) resistor Rs so that the current determination unit 24 determines whether the input current Iin is normal or not according to the cross voltage Vc. When the current determination unit 24 determines that the cross voltage Vc is normal, the current determination unit 24 provides the first control signal Sc1 to turn on the first switch unit 1 so that the input power Vin is provided to the LED drive circuit 200 through the first switch unit 1. On the contrary, the first switch unit 1 is turned off to protect the LED drive circuit 200. After the current determination unit 24 turns off the first switch unit 1 and the determines that the input current Iin returns to the predetermined range according to the cross voltage Vc, the current determination unit 24 turns on the first switch unit 1 again so that the input power Vin can be provided to the LED drive circuit 200 through the first switch unit 1.

In one embodiment, FIG. 4 shows the detailed circuit of the current monitoring circuit 2 and the first switch unit 1 representing the spirit of the present discourse. However, the current monitoring circuit 2 and the first switch unit 1 are not limited to be implemented only in the circuit structure of FIG. 4. Any electronic circuit, controller, and logic circuit that can detect and determine the input current Iin should be included in the scope of this embodiment.

Figure 5:
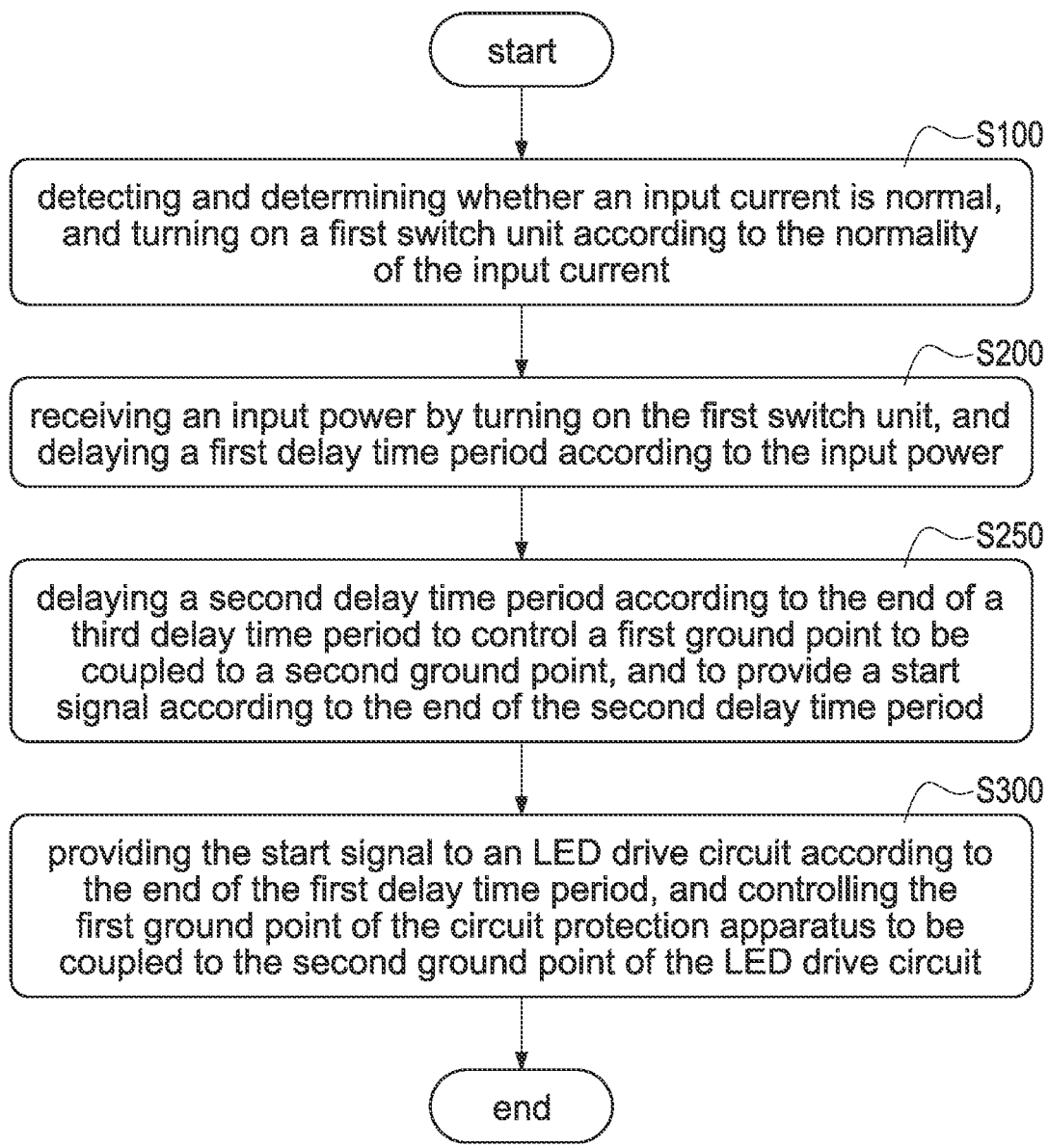
FIG. 5 is a flowchart of a method of operating the circuit protection apparatus according to the present disclosure.

Please refer to FIG. 5, which shows a flowchart of a method of operating the circuit protection apparatus according to the present disclosure, and also refer to FIG. 1 to FIG. 4. The method of operating the circuit protection apparatus 100 is used to protect an LED drive circuit 200. The method includes steps of: detecting and determining whether an input current is normal, and turning on a first switch unit according to the normality of the input current (S100). A preferred embodiment is to detect and determine whether the input current Iin is normal through the current monitoring circuit 2. When the input current Iin is abnormal (that is, for example, but not limited to, the input current Iin is too small or too large, or even no input current Iin), the current monitoring circuit 2 provides the first control signal Sc1 to turn off the first switch unit 1. When the input current Iin is normal (that is, the input current Iin is within a predetermined range), the current monitoring circuit 2 provides the first control signal Sc1 to turn on the first switch unit 1 so that the input power Vin is provided to the LED drive circuit 200 through the first switch unit 1. In this condition, although the LED drive circuit 200 has received the input power Vin, it has not started yet.

Afterward, receiving the input power by turning on the first switch unit, and delaying a first delay time period according to the input power (S200). A preferred embodiment is that the snubber circuit 3 receives the input power Vin by turning on the first switch unit 1 (due to the turned-on first switch unit 1), and the conversion circuit 36 converts the input power Vin into the working voltage Vcc, for example, but not limited to, voltage conversion from 48 volts to 3.3 volts. The control unit 32 starts to operate after receiving the working voltage Vcc and starts to count the predetermined first delay time period Td1, for example, but not limited to, 1 to 4 seconds.

Finally, providing a start signal to the LED drive circuit according to the end of the first delay time period, and controlling a first ground point of the circuit protection apparatus to be coupled to a second ground point of the LED drive circuit (S300). A preferred embodiment is that when the counting of the first delay time period Td1 expires, the snubber circuit 3 provides the start signal Ss to the controller inside the LED drive circuit 200 through the control unit 32 so that the controller can start to operate. On the other hand, the control unit 32 also provides the second control signal Sc2 to the first switch Q1 of the second switch unit 34 to turn on the first switch Q1. When the first switch Q1 is turned on, the second switch Q2 is also turned on, and therefore the first ground point G1 and the second ground point G2 are connected together so that the LED drive circuit 200 has a complete common-connected ground network.

The additional step includes delaying the second delay time period according to the end of the third delay time period to control the first ground point to be coupled to the second ground point, and to provide the start signal according to the end of the second delay time period (S250). A preferred embodiment is that when the delay circuit 38 is used, the control unit 32 further sets the third delay period Td3 (for example, but not limited to, 1 to 3 seconds). The control unit 32 provides the second control signal Sc2 to the second switch unit 34 according to the end of the third delay time period Td3, and the second switch unit 34 is turned on after the end of the second delay time period Td2 provided by the delay time circuit 38 so that the first ground point G1 is connected to the second ground point G2. That is, after the second delay time period Td2 ends, the control unit 32 provides the start signal Ss to start the controller 200A. In one embodiment, the more detailed operation method of the circuit protection apparatus 100 may be referred to the description in FIG. 2 to FIG. 4, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A circuit protection apparatus (100) configured to protect an LED drive circuit (200), the circuit protection apparatus (100) comprising:
   a first switch unit (1) coupled between an input terminal (100A) and the LED drive circuit (200), and configured to provide an electrical connection between the input terminal (100A) and the LED drive circuit (200) according to the normality of an input current (Iin) flowing through the input terminal (100A), and
   a snubber circuit (3) coupled to the first switch unit (1) and the LED drive circuit (200), and configured to provide a first delay time period (Td1) according to an input power (Vin),
   wherein the snubber circuit (3) is configured to provide a start signal (Ss) to the LED drive circuit (200) according to the end of the first delay time period (Td1), and control a first ground point (G1) of the snubber circuit (3) to be coupled to a second ground point (G2) of the LED drive circuit (200).

2. The circuit protection apparatus (100) as claimed in claim 1, wherein the snubber circuit (3) comprises:
   a control unit (32) coupled to the first switch unit (1) and the LED drive circuit (200), and configured to set and count the first delay time period (Td1), and
   a second switch unit (34) coupled to the control unit (32), the first ground point (G1), and the second ground point (G2),
   wherein the control unit (32) is configured to provide the start signal (Ss) according to the end of the first delay time period (Td1), and provide a control signal (Sc2) to turn on the second switch unit (34).

3. The circuit protection apparatus (100) as claimed in claim 2, wherein the snubber circuit (3) further comprises:
   a time delay circuit (38) coupled to the second switch unit (34), and configured to turn on the second switch unit (34) after a second delay time period (Td2) according to the control signal (Sc2),
   wherein the control unit (32) is further configured to set a third delay time period (Td3), and provide the control signal (Sc2) according to the end of the third delay time period (Td3); the first delay time period (Td1) is the sum of the second delay time period (Td2) and the third delay time period (Td3).

4. The circuit protection apparatus (100) as claimed in claim 3, wherein the control unit (32) is configured to set the third delay time period (Td3) to be 1 second to 3 seconds, and the second delay time period (Td2) responds to a capacitance of the time delay circuit (38).

5. The circuit protection apparatus (100) as claimed in claim 2, wherein the snubber circuit (3) further comprises:
   a conversion circuit (36) coupled to the first switch unit (1), the LED drive circuit (200), and the control unit (32), and configured to convert the input power (Vin) into a working power (Vcc) to supply power to the control unit (32).

6. The circuit protection apparatus (100) as claimed in claim 1, wherein the LED drive circuit (200) further comprises a primary-side ground point (Gp) and a secondary-side ground point (Gs); the primary-side ground point (Gp) is coupled to the first ground point (G1), and the secondary-side ground point (Gs) is the second ground point (G2); the snubber circuit (3) is configured to control the primary-side ground point (Gp) to be coupled to the secondary-side ground point (Gs) according to the end of the first delay time period (Td1).

7. The circuit protection apparatus (100) as claimed in claim 1, further comprising:
   a current monitoring circuit (2) coupled to the input terminal (100A) and the first switch unit (1), and configured to detect and determine whether the input current (Iin) is normal to turn on or turn off the first switch unit (1).

8. A snubber circuit (3) coupled to an LED drive circuit (200), and configured to delay starting the LED drive circuit (200) according to in input power (Vin), the snubber circuit (3) comprising:
   a control unit (32) coupled to the LED drive circuit (200), and configured to set and count a first delay time period (Td1), and
   a second switch unit (34) coupled to the control unit (32), a first ground point (G1) of the snubber circuit (3), and a second ground point (G2) of the LED drive circuit (200),
   wherein the control unit (32) is configured to delay the first delay time period (Td1) according to the input power (Vin), provide a start signal (Ss) to the LED drive circuit (200) according to the end of the first delay time period (Td1), and provide a control signal (Sc2) to turn on the second switch unit (34) according to the end of the first delay time period (Td1) so as to control the first ground point (G1) to be coupled to the second ground point (G2).

9. The snubber circuit (3) as claimed in claim 8, further comprising:
   a time delay circuit (38) coupled to the second switch unit (34), and configured to turn on the second switch unit (34) after a second delay time period (Td2) according to the control signal (Sc2),
   wherein the control unit (32) is further configured to set a third delay time period (Td3), and provide the control signal (Sc2) according to the end of the third delay time period (Td3); the first delay time period (Td1) is the sum of the second delay time period (Td2) and the third delay time period (Td3).

10. The snubber circuit (3) as claimed in claim 9, wherein the control unit (32) is configured to set the third delay time period (Td3) to be 1 second to 3 seconds, and the second delay time period (Td2) responds to a capacitance of the time delay circuit (38).

11. The snubber circuit (3) as claimed in claim 8, further comprising:
   a conversion circuit (36) coupled to the LED drive circuit (200) and the control unit (32), and configured to convert the input power (Vin) into a working power (Vcc) to supply power to the control unit (32).

12. The snubber circuit (3) as claimed in claim 8, wherein the LED drive circuit (200) further comprises a primary-side ground point (Gp) and a secondary-side ground point (Gs); the primary-side ground point (Gp) is coupled to the first ground point (G1), and the secondary-side ground point (Gs) is the second ground point (G2); the control unit (32) is configured to control the primary-side ground point (Gp) to be coupled to the secondary-side ground point (Gs) according to the end of the first delay time period (Td1).

13. A method of operating a circuit protection apparatus (100) configured to protect an LED drive circuit (200), the method comprising steps of:
- detecting and determining whether an input current (Iin) is normal, and turning on a first switch unit (1) according to the normality of the input current (Iin),
- receiving an input power (Vin) by turning on the first switch unit (1), and delaying a first delay time period (Td1) according to the input power (Vin), and
- providing a start signal (Ss) to the LED drive circuit (200) according to the end of the first delay time period (Td1), and controlling a first ground point (G1) of the circuit protection apparatus (100) to be coupled to a second ground point (G2) of the LED drive circuit (200).

14. The method of operating the circuit protection apparatus (100) as claimed in claim 13, further comprising steps of:
- setting a second delay time period (Td2) and a third delay time period (Td3), and delaying the second delay time period (Td2) according to the end of the third delay time period (Td3) to control the first ground point (G1) to be coupled to the second ground point (G2), and
- providing the start signal (Ss) according to the end of the second delay time period (Td2),
- wherein the first delay time period (Td1) is the sum of the second delay time period (Td2) and the third delay time period (Td3).

15. The method of operating the circuit protection apparatus (100) as claimed in claim 13, further comprising a step of:
- turning off the first switch unit (1) according to the abnormality of the input current (Iin).

* * * * *